United States Patent
Lopez

(10) Patent No.: US 6,681,824 B2
(45) Date of Patent: Jan. 27, 2004

(54) HEAVY LOAD BEARING TIRE HAVING TREAD INCLUDING AT LEAST ONE INCISION

(75) Inventor: Jose Merino Lopez, Riom (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 110 days.

(21) Appl. No.: 09/898,146

(22) Filed: Jul. 3, 2001

(65) Prior Publication Data

US 2002/0017349 A1 Feb. 14, 2002

(30) Foreign Application Priority Data

Jul. 3, 2000 (FR) .............................. 00 08650

(51) Int. Cl.⁷ .............................................. B60C 11/12
(52) U.S. Cl. ........................... 152/209.21; 152/209.23; 152/DIG. 3
(58) Field of Search ................ 152/209.17, 209.18, 152/209.21, 209.23, DIG. 3

(56) References Cited

U.S. PATENT DOCUMENTS

| | | | |
|---|---|---|---|
| 3,608,602 A | | 9/1971 | Youngblood ................ 152/212 |
| 5,772,806 A | * | 6/1998 | Moriya |
| 5,783,002 A | | 7/1998 | Lagnier .................. 152/209 R |
| 5,924,464 A | * | 7/1999 | White |
| 6,116,310 A | * | 9/2000 | Shinohara |
| 6,408,910 B1 | * | 6/2002 | Lagnier et al. |

FOREIGN PATENT DOCUMENTS

| | | |
|---|---|---|
| EP | 0989000 | 3/2000 |
| FR | 2763892 | 12/1998 |
| JP | 02-197402 | 8/1990 |
| JP | 10-6714 | * 1/1998 |
| JP | 00094908 | 4/2000 |
| JP | 2000-238514 | 9/2000 |

OTHER PUBLICATIONS

Machine translation for Japan 2000–238514.*
Machine translation for Japan 2000–94908.*
English–language Abstract for JP 2000238514, published Sep. 5, 2000.
English–language Abstract for JP 2000094908, published Apr. 4, 2000.
English–language Abstract for JP 02197402, published Aug. 6, 1990.

* cited by examiner

Primary Examiner—Steven D. Maki
(74) Attorney, Agent, or Firm—Baker Botts L.L.P.

(57) ABSTRACT

A tread for a tire bearing heavy loads, the tread being made of a rubber mix and having at least one incision defined by opposing walls, each wall having elements in relief intended to cooperate with the elements in relief of the facing wall in the contact of the tread with the roadway. The width of the incision is at a maximum in that region of the tread which undergoes the maximum deformations due to the Poisson effect resulting from the loading of the tread in the contact with the roadway, in order to obtain more effective cooperation of the walls defining said incision in the contact.

5 Claims, 2 Drawing Sheets

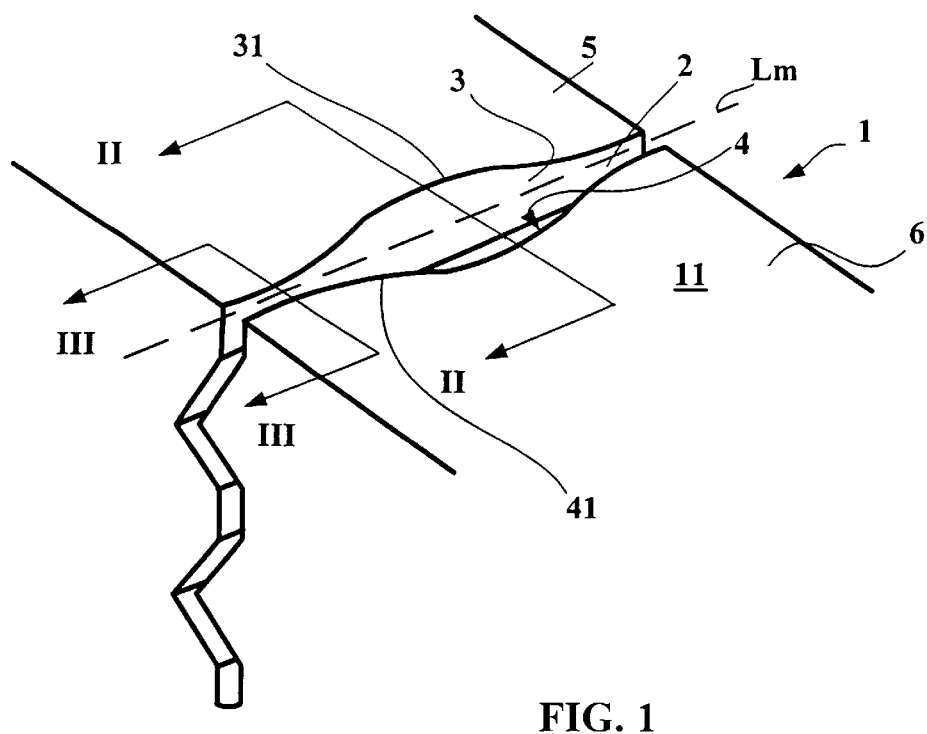
FIG. 1
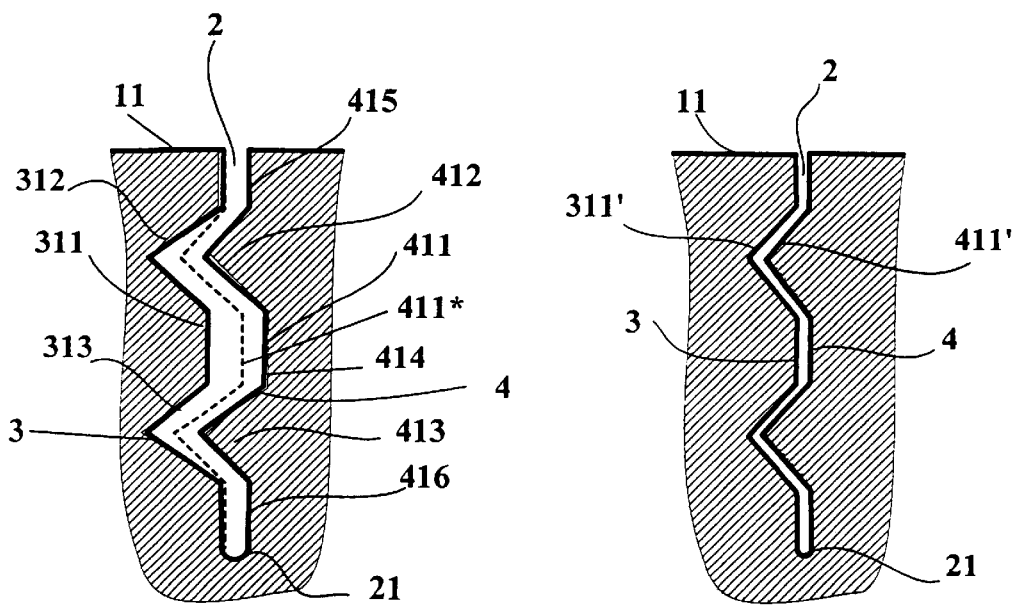 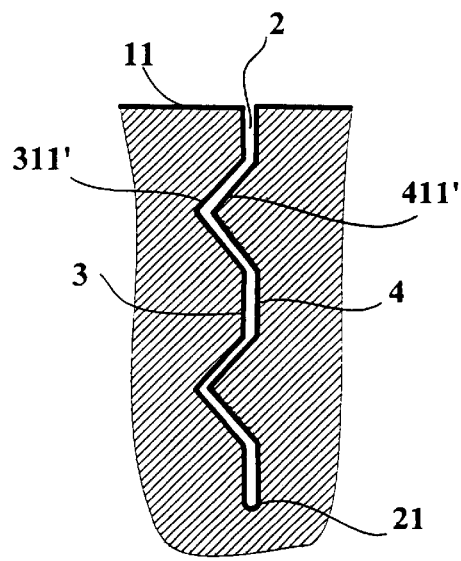
FIG. 2  FIG. 3

HEAVY LOAD BEARING TIRE HAVING TREAD INCLUDING AT LEAST ONE INCISION

BACKGROUND OF THE INVENTION

The invention relates to tires and to treads for tires of vehicles intended to bear heavy loads, and in particular the tread patterns of such treads which are provided with incisions.

In order to improve the road-holding of a vehicle when travelling in particular on wet or icy roads, it is necessary that the treads of the tires on this vehicle have sufficient grip on the road surface. To this end, it is known to provide the tread of each tire with motifs in relief defined by cutouts (grooves and/or incisions), these cutouts having, inter alia, the function of acting as evacuation channels. Each motif may furthermore comprise at least one incision in order to create a larger number of ridges intended to break up the layer of water covering the roadway. "Cutout" is to be understood to mean a slit which may have a rectilinear or other type of trace, for example curved, undulating, whatever the section plane (longitudinal, transverse or oblique) in question.

Of course, a necessary compromise has to be achieved between the number of cutouts and the rigidity of the tread, because an excessive number of cutouts (grooves and/or incisions) results in a significant reduction in the rigidity of the motifs in relief. In particular, under the action of forces tangential to the contact surface of the tire with the roadway, in particular on cornering, the motifs may be excessively deformed, which then results in a loss of road-holding capability.

In order to solve this problem, it was proposed to make incisions, in which the opposing walls are provided with means arranged to restrict the relative movements of one wall in relation to the facing wall.

For example, in FR 2 025 124 it is proposed to make incisions, the surfaces of the main opposing walls of which defining said incisions have a relief while remaining substantially parallel to each other, whatever the trace obtained on any section plane.

Furthermore, U.S. Pat. No. 5,783,002 describes a tread which makes it possible to obtain optimum properties of the elements in relief of this tread throughout the useful life of the tire equipped with the tread. This tread comprises at least one incision defined by two facing walls, each having a surface in relief formed of protrusions and cavities which are arranged in a specific manner on either side of an average wall surface, said protrusions of a wall being intended to cooperate, by interleaving, with the cavities of the facing wall, and vice versa.

The solutions described in these documents have proved to be of very high performance for tires intended for passenger vehicles or more generally vehicles bearing relatively light loads. However, it was noted that when these same solutions were applied to the case of tires for vehicles bearing heavy loads—in particular heavy vehicles—the loads borne by the different tires created high contact pressures and hence high loading pressures of the motifs in relief of the treads. Under these contact pressures, the rubber mix constituting each of the motifs in relief of the tread is squashed and tends, by what is called the Poisson effect, to be deformed in all the transverse free directions relative to the direction of the contact pressures, that is to say in the directions in which said mixture is not materially limited.

Under this effect which results from the compression, it is observed that the protrusions and cavities with which a first main wall is provided, which defines an incision with a second main wall facing it, cannot cooperate with all the protrusions and cavities of said second wall, each of said main walls being deformed during the loading of the tread in non-homogenous (non-regular) manner. In fact, it is noted that only certain parts of the walls of the incision come into contact and ensure the blocking function of said walls against each other (these contacting parts correspond to those parts in which the deformation by Poisson effect is at a maximum). It is furthermore noted that the deformation by Poisson effect is modified in the vicinity of the points of contact with the roadway according to the contact conditions (sliding possible or not possible between the contact surface of the tread and the roadway).

SUMMARY OF THE INVENTION

One object of the present invention is to form a tread for a tire which is intended to bear high loads and comprises incisions which do not have the disadvantages which have been discussed above.

To this end, the tread according to the invention manufactured in a rubber-type material comprises at least one incision which is defined by opposing walls (that is to say, ones which face each other), each wall being defined geometrically by an average surface bearing elements in relief, the elements in relief (protrusions, cavities) of a wall being intended to cooperate with the elements in relief of the facing wall in the contact of the tread with the roadway.

In order to obtain more effective cooperation of the walls of an incision which is defined by two walls provided with elements in relief (hollows and protrusions), the width of the incision—that is to say the distance between the walls 3, 4 measured parallel to the running surface 11 when new—is not constant in all directions, and is variable at least in the direction of the depth of the incision. More specifically, the width of the incision according to the invention is at a maximum in that region of the tread which undergoes the maximum deformation due to the Poisson effect resulting from the loading of the tread in the contact with the roadway.

In this manner, the cooperation of the opposing walls of an incision is more effective since all the motifs in relief on one wall cooperate with all the motifs in relief of the facing wall, the difference in incision width being compensated by the transverse deformation of the rubber mix upon the loading of the tread.

In a first simple variant embodiment, the variations in the width of the incision according to the invention are substantially identical whatever the section plane perpendicular to the running surface of the tread and substantially perpendicular to the average surface of said incision (defined as the surface passing halfway between the opposing walls defining the incision).

Preferably, the maximum width of the incision is located substantially at a depth greater than or equal to half the depth of said incision.

In another variant embodiment, the curves of iso-width of the incision are curvilinear and concentric about a central region of the motif of the incision, said central region being located substantially at half the depth of the incision and at equal distance from the lateral ridges formed by said incision. "Central region of the motif of the incision" is understood to mean the region which is substantially at equal distance from the running surface and from the base of the incision and at equal distance from the lateral ends of said incision.

In practice, if a wall surface of an element of rubber mix defining an incision according to the invention is displaced to flatten it against the facing wall surface defining the same incision, there is obtained:

outside the zone of contact of the tread with the roadway, partial contact, that is to say contact only on the parts limiting said surfaces (these parts comprise the ridges formed by the incisions on said walls);

in the zone of contact of the tread with the roadway, total or virtually total contact of the surfaces of walls which are deformed in the transverse directions by the Poisson effect, this deformation locally compensating for the differences in initial width of the incision.

It is thus possible substantially to improve the blocking of the opposing walls of the incision upon loading. This is particularly advantageous when the tread is new, since after partial wear of said tread the incisions have decreasing depths and consequently the need to block the walls defining said incisions also decreases.

The tread pattern according to the invention may be applied to a tire of any type, it being understood that the distribution of the widths of an incision is a function of the transverse deformations due to the Poisson effect during the loading of the rubber blocks of the tread in contact with the roadway.

An incision according to the invention can be produced easily by conventional means such as, for example, using a blade having suitable surface geometries and distribution of thicknesses.

The characteristics of the invention will become apparent from the following description, with reference to the attached drawings and showing, by way of non-limitative examples, embodiments of the invention.

DESCRIPTION OF THE DRAWINGS

FIG. 1 is a perspective view of a tread incision according to the invention;

FIG. 2 is a view in section in a section plane II—II of FIG. 1 perpendicular to the running surface of the tread;

FIG. 3 is a view in section in a section plane III—III of FIG. 1 perpendicular to the running surface of the tread;

DESCRIPTION OF PREFERRED EMBODIMENTS

Figure 4:
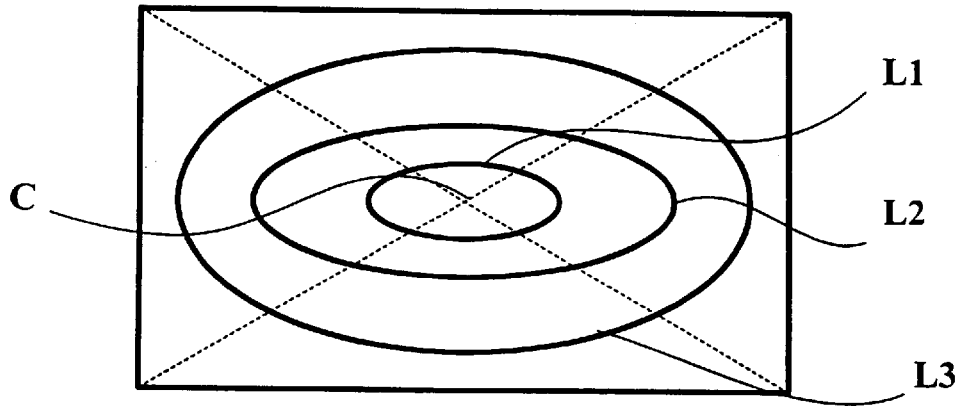
FIG. 4 shows a distribution of the curves of iso-width of another variant of an incision according to the invention.

FIG. 1 shows part of a tread 1 for a tire fitted on a heavy vehicle and provided with an incision 2 according to the invention (the configuration shown corresponds to the tread outside the zone of contact with the roadway, that is to say non-loaded). The incision 2 shown is defined by opposing walls 3, 4 of two blocks of rubber 5, 6 and has a rectilinear general shape on said running surface 11 and a zigzag general shape within the thickness of the tread. The walls 3, 4 defining the incision 2 are provided with protruding parts and hollowed parts which are intended to cooperate when the rubber blocks 5, 6 come into contact with the roadway and the incision closes (that is to say, when the walls 3, 4 approach each other).

The incision 2 present on the running surface 11 of the tread when new has a width which is variable in the direction of its length and at a maximum in its median part.

In order to compensate for the so-called Poisson effect, which causes deformation of the rubber blocks 5, 6 defining the incision 2, said incision cuts into the running surface 11 to form two ridges 31 and 41, the traces of which are substantially symmetrical relative to a rectilinear average line Lm shown in broken lines and having a maximum distance in the median part of the length of the incision (measured along Lm).

FIG. 2 shows a section along a plane II—II of the non-loaded tread which can be seen in FIG. 1. In this section plane, which is taken substantially in the median part of the incision 2 and perpendicular to the running surface 11, it can be seen that this incision 2 is defined by two surfaces 3, 4, the traces 311, 411 of which on the section plane cannot be superposed, that is to say that the approach of the surface 4 towards the surface 3 does not make it possible to superpose them completely (the trace 411* in broken lines shows such an approach) and that there remains between the trace 311 and the trace 411 * a space intended to be compensated by the deformation of the rubber blocks 5, 6 resulting from the Poisson effect in contact with the roadway.

On the wall 4 it can be seen that two protrusions 412, 413 are present which are spread apart in the direction of the depth of the incision by a part 414 substantially perpendicular to the running surface 11, said two protrusions 412, 413 being extended respectively towards the outside of the tread and towards the bottom of the incision also by parts 415, 416 perpendicular to the running surface 11. The wall 3 comprises two cavities 312, 313 which are intended to cooperate with the protrusions 412, 413 of the wall 4 when the tread is loaded.

The width of the incision 2 taken in the section plane II—II and measured parallel to the running surface 11 is at a maximum at mid-depth between the running surface 11 when new and the bottom of the incision 21.

In FIG. 3, which shows a section along a plane III—III produced on the tread 1 of FIG. 1 in the vicinity of one of the lateral ends of the incision, it can be seen that the average profiles of the traces 311' and 411' of the surfaces of walls 3 and 4 defining the incision are generally similar to the average profiles of the traces 311 and 411 of the same surfaces of walls 3 and 4 in the section plane II—II shown in FIG. 2. However, the width of the incision 2, measured between the traces of the walls 3 and 4 in the plane III—III is substantially constant over the entire depth of the incision 2 and is less than the smallest of the widths of the same incision which are measured on the section plane II—II.

Preferably, an incision is made which is defined by walls of rubber mix, the spacings of which (distances at any point between said walls) follow a distribution as shown in FIG. 4. In this FIG. 4, the lines of the same width (or iso-width) of an incision are plotted on the average surface of said incision: in order to obtain an optimum effect of cooperation of one wall with the facing wall defining an incision on passing into contact with the roadway, it is preferable for the lines of iso-width to be substantially centered and for the greatest widths to be located close to the central part C of the incision. "Central part of an incision" is to be understood here to mean that part of the incision which is at approximately half the depth of said incision and at equal distance from the lateral ends of this incision (that is to say where the transverse deformation—in a direction perpendicular to the walls defining the incision—resulting from the Poisson effect by compression are at a maximum).

In one example of application of the visible distribution in this FIG. 4 in the case of a tread for a tire intended to be fitted on a heavy vehicle, the lines L1 represent a width of 3.5 mm, L2 of 1.5 mm and L3 of 1 mm; on the edges of the incision the width of the incision is less than or equal to 0.5 mm.

Figure 5:
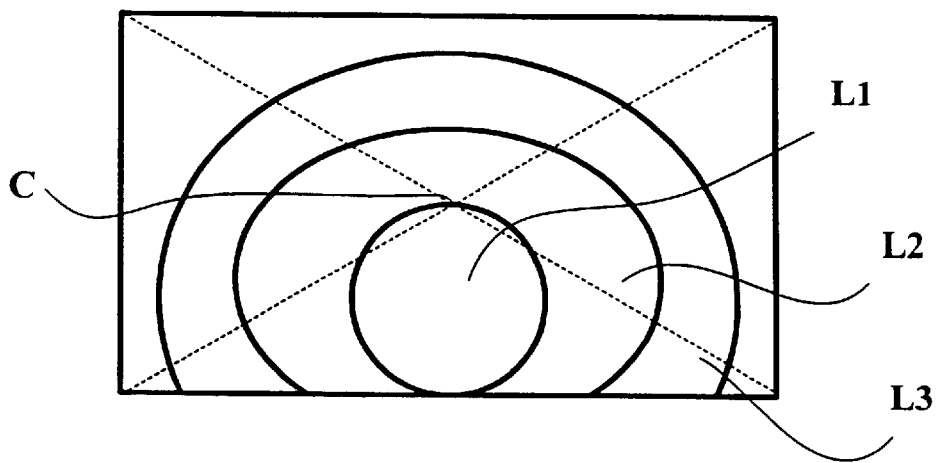
FIG. 5 shows another distribution of the curves of iso-width of another variant of an incision according to the invention.

A another variant, the curves of iso-width L1, L2, L3 of FIG. 4 are all translated by the same amount towards the bottom of the incision as shown in FIG. 5.

As we have described, the Poisson effect is a function of the compressive force withstood by the rubber elements forming the tread and, consequently, it is within the scope of the person skilled in the art to adjust the widths of the incision according to the invention according to the type of tire, the inflation pressure used, the number of incisions and the depth of said incisions and the mechanical characteristics of the rubber mixes.

The invention is not limited to the examples described and shown, and various modifications can be made thereto without departing from the scope of the invention.

I claim:

1. A heavy-Load bearing tire having a tread, the tread being made of a rubber mix and comprising at least one incision, said at least one incision being defined by opposing walls, each wall being defined geometrically by an average surface having hollowed and/or protruding elements in relief, the elements in relief of one wall being intended to cooperate with the elements in relief of the opposing wall when the tread contacts a roadway, wherein the tread defines a running surface and the width of the at least one incision is variable and is at a maximum in that region of the tread which undergoes maximum Poisson effect deformation resulting when said tread bears a load during contact with the roadway, to obtain, over the entire surface of the walls defining said at least one incision, cooperation of all the elements in relief of said walls.

2. A heavy-load bearing tire having a tread according to claim 1, wherein the width of the incision varies over the depth of the incision but is substantially the same along the length of the incision.

3. A heavy-load bearing tire having a tread according to claim 1, wherein the maximum width of the at least one incision is located substantially at a depth corresponding to half the depth of said at least one incision.

4. A heavy-load bearing tire having a tread, the tread being made of a rubber mix and comprising at least one incision, this at least one incision being defined by opposing walls, each wall being defined geometrically by an average surface having hollowed and/or protruding elements in relief, the elements in relief of one wall being intended to cooperate with the elements in relief of the facing wall when the tread contacts a roadway, wherein the tread defines a running surface and the width of the at least one incision is variable and is at a maximum in that region of the tread which undergoes maximum Poisson effect deformation resulting when said tread bears a load during contact wit the roadway, to obtain, over die entire surface of the walls defining said at least one incision, cooperation of all the elements in relief of said walls, wherein curves of iso-width L1, L2, L3 of the at least one incision are substantially curvilinear and concentric.

5. A heavy-load bearing tire having a tread according to claim 4, wherein the curves of iso-width L1, L2, L3 of the at least one incision are substantially concentric about a central region of the at least one incision, wherein the at least one incision forms lateral ridges on each wall and said central region is located substantially at half the depth of the at least one incision and at equal distance from the lateral ridges formed by said at least one incision.

* * * * *

UNITED STATES PATENT AND TRADEMARK OFFICE
CERTIFICATE OF CORRECTION

PATENT NO. : 6,681,824 B2
DATED : January 27, 2004
INVENTOR(S) : Lopez, Jose Merino It is certified that error appears in the above-identified patent and that said Letters Patent is hereby corrected as shown below:

<u>Title page</u>,
Item [75], Inventor, "Jose" should read -- José --

<u>Column 5</u>,
Line 4, "A" should read -- In --
Line 19, "heavy-Load" should read -- heavy-load --

<u>Column 6</u>,
Line 20, "die" should read -- the --

Signed and Sealed this

Twenty-second Day of June, 2004

JON W. DUDAS
*Acting Director of the United States Patent and Trademark Office*